United States Patent [19]
Taylor et al.

[11] 3,797,690
[45] Mar. 19, 1974

[54] PREPARATION OF DEGRADABLE POLYMERIC MATERIAL

[75] Inventors: Lynn J. Taylor, Haslett; John W. Tobias, E. Lansing, both of Mich.

[73] Assignee: Owens-Illinois, Inc., Toledo, Ohio

[22] Filed: Dec. 8, 1971

[21] Appl. No.: 206,144

[52] U.S. Cl. ............ 220/1 R, 117/94, 117/138.8 E, 177/160 R, 117/161 R, 220/DIG. 30, 260/23 H
[51] Int. Cl. .............................................. B44d 1/02
[58] Field of Search ........... 117/94, 161 R, 138.8 E; 260/23 H; 220/DIG. 30, 1 R

[56] References Cited
UNITED STATES PATENTS

| | | | |
|---|---|---|---|
| 2,704,259 | 3/1955 | Lamb | 220/DIG. 30 |
| 3,320,695 | 5/1967 | Moore | 220/DIG. 30 |
| 3,647,111 | 3/1972 | Stager et al. | 117/94 |
| 3,454,510 | 7/1969 | Newland et al. | 260/23 H |
| 3,551,235 | 12/1970 | Bassemir et al. | 117/161 R X |
| 3,552,986 | 1/1971 | Bassemir et al. | 117/161 R X |
| 3,619,245 | 11/1971 | Maekawa | 117/160 R |
| 3,695,917 | 10/1972 | Abu-Isa | 117/160 R |

*Primary Examiner*—Edward G. Whitby
*Attorney, Agent, or Firm*—Donald Keith Wedding

[57] ABSTRACT

There is disclosed the preparation of a degradable polymeric material by applying a degradation-sensitizing reagent to the surface of a polymeric material and then diffusing the reagent into such surface.

10 Claims, No Drawings

PREPARATION OF DEGRADABLE POLYMERIC MATERIAL

BACKGROUND OF THE INVENTION

This invention relates to novel plastic compositions having enhanced environmental degradability.

The advent of plastics has given rise to improved methods of packaging goods. For example, polyethylene and polypropylene plastic films, bags, bottles, styrofoam cups and blister packages have the advantages of being chemically resistant, relatively unbreakable, light in weight and translucent or transparent. The increasing use of plastics in packaging applications has created a serious waste disposal problem. Burning of these plastic materials is unsatisfactory since it adds to air pollution problems.

Unlike some other packaging materials, such as paper and cardboard, plastics are not readily destroyed by the elements of nature. Thus, burying them is not an effective means of disposal, and can be expensive.

Plastics are biologically recent developments, and hence are not easily degradable by micro-organisms which attack most other forms of organic matter and return them to the biological life cycle. It has been estimated that it may take millions of years for organisms to evolve which are capable of performing this function. In the meantime, plastic containers and packaging films are beginning to litter the countryside after being discarded by careless individuals.

One approach to the alleviation of the problem of plastics waste and litter would involve the development of novel polymeric compositions which undergo accelerated degradation under environmental conditions. This general approach has been described in the prior art. For example, reference is made to British Patent Specification 1,128,793, which describes ethylenecarbon monoxide copolymers which undergo rapid deterioration when subjected to sunlight.

An alternative approach involves the use of oxygen, rather than sunlight, as the primary initiator of polymer degradation.

The enhancement of the rate of environmental deterioration of plastics through the use of oxidation-promoting additives is known in the prior art. For example, the preparation of degradable polyolefin films containing certain organic derivatives of transition metals is described in U.S. Pat. No. 3,454,510.

The use of degradation-sensitizing additives, particularly those which accelerate degradation by thermal or oxidative processes, can be complicated as a result of undesired degradation of the polymer composition during the processing of a molten thermoplastic. The invention at bar is intended to avoid this difficult prior art problem.

In accordance with this invention, a polymeric material-degradation-sensitizing non-polymeric reagent is applied to the surface of a polymeric material and diffused into such surface so as to prepare a degradable polymeric material.

As used herein, the term 'degradation-sensitizing' reagent is intended to include any inorganic or organic, non polymeric reagent which will promote or accelerate the degradation of a polymeric material when such reagent is appropriately diffused into the surface thereof. The resulting degradation may be by any suitable function or mechanism including heat, light, oxygen, moisture, micro-organisms, etc.

Preferred polymer-degradation sensitizing reagents are those which accelerate autoxidation and/or photooxidation processes. These include free-radical initiating reagents, metallo-organic autoxidation catalysts, readily autoxidized organic compounds, and photosensitizers.

Specific examples of useful polymer-degradation sensitizing reagents include organic peroxides and hydroperoxides, such as tert-butyl hydroperoxide, cumene hydroperoxide, diisopropylbenzene hydroperoxide, 2,5-dimethylhexane-2,5-dihydroperoxide, p-menthane hydroperoxide; 1,1,3,3-tetramethylbutyl hydroperoxide, acetyl peroxide, benzoyl peroxide, p-chlorobenzoyl peroxide, 2,4-dichlorobenzoyl peroxide, ditoluoyl peroxide, decanoyl peroxide, lauroyl peroxide, isobutyryl peroxide diisononanoyl peroxide, pelargonyl peroxide, tert-butyl peroxyacetate, tert-butyl peroxymaleic acid, tert-butyl peroxy-isobutyrate, tert-butyl peroxypivalate, tert-butyl peroxybenzoate, tert-butyl peroxycrotonate, tert-butyl peroxy-(2-ethylhexanote), 2,5-dimethyl-2,5-bis-(2-ethylhexanoylperoxy) hexane, 2,5-dimethyl-2,5-bis-(benzoylperoxy) hexane, 2,5-dimethyl-2,5-bis-(tert-butyl-peroxy) hexane, 2,5-dimethyl-2,5-bis-(tert-butylperoxy)-hexyne-3,-di-tert-butyl diperoxyphthalate, 1,1,3,3-tetramethylbutylperoxy-2-ethylhexanoate, di-tert-butyl peroxide, di-tert-amyl peroxide, tert-amyl-tert-butyl peroxide, 1,1-tert-butylperoxy-3,3,5-trimethyl cyclohexane, bis-(tert-butylperoxy)-diisopropylbenzene, n-butyl-4,4-bis-(tert-butylperoxy) valerate, dicumyl peroxide, acetyl acetone peroxide, methyl ethyl ketone peroxide, peroxide, peroxide, tert-butylperoxy isopropyl carbonate, 2,2-bis-(tert-butylperoxy)butane, di-(2-ethylhexyl) peroxydicarbonate, and bis-(4-tert-butylcyclohexyl) peroxydicarbonate.

Organic azo compounds may also be employed as polymer-degradation sensitizing reagents. Typical examples include 2-azo-bis-isobutyronitrile, 2-azo-bis-propionitrile, dimethyl-2-azo-bis-isobutyrate, 1-azo-bis-1-cyclohexanecarbonitrile, 2-azo-bis-2-methylheptanitrile, 2-azo-bis-2-methylbutyronitrile, 4-azo-bis-4-cyanopentanoic acid, azodicarbonamide, and azobenzene.

Also useful as polymer-degradation sensitizing reagents are metallo-organic compounds, particularly those derived from transition metals. Specific examples include acetates, acetylacetonates, benzoyl-acetonates, dodecylacetylacetonates, benzoates, butyrates, citrates, cyclohexanebutyrates, disalicylideneethylenediamine chelates, 2-ethylhexanoates, laurates, linoleates, linolenates, myristates, naphthenates, neodecanoates, oleates, palmitates, phthalocyanines, stearates, tallates, tartrates, 3,5,5-trimethyl hexanoates, and valerates, all derived from the following metals: cobalt, chromium, copper, iron, nickel, and manganese. In such materials, the transition metal may be present in any readily accessible valence state; for example, cobalt may be present in the cobaltous or cobaltic state, copper in the cuprous or cupric state, and iron in the ferrous or ferric state.

A variety of organic materials which undergo facile autoxidation may also be employed as polymer-degradation sensitizing reagents. Typical examples include olefinic materials such as 1-hexadecene, 1-docosene, allyl benzene, methallyl benzene, 1-allyl naphthalene, isobutylene trimer, isobutylene tetramer, dicyclopentadiene, indene, alpha-phellandrene, and squalene; ethers such as polyethylene glycol and its esters, polypropylene glycol and its esters, poly(tetrahydrofuran), dibenzyl ether, bis-(alpha-methylbenzyl)ether, and p-dibenzyloxybenzene; acetals such as citral dimethyl acetal, isosafrole, methyl eugenol, safrole, dihydrosafrole, and phenylacetaldehyde diethyl acetal; amines such as benzylidimethylamine, N,N-dibenzylaniline, 4,4'-methylene bis-(N,N-dimethylaniline), 4,4',4''-methylidynetris-(N,N-dimethylaniline), p,p'-benzylidene bis(N,N-dimethylaniline), oleylamine, linoleylamine, and spermine; aldehydes such as decanal, dodecanal, citral, citronellal, cinnamaldehyde, alpha-n-hexyl-cinnamaldehyde, anisaldehyde, p-isopropylbenzaldehyde, p-benzyloxybenzaldehyde, and p-n-octyloxybenzaldehyde; aromatic compounds such as n-dodecyl-benzene, dimethylnaphthalene (various isomers), diphenylmethane, bibenzyl, phenylcyclohexane, tetrahydronaphthalene, fluorene, xanthene, 1,3,5-triisopropylbenzene, 1,2-dihydronaphthalene, and 9,10-dihydroanthracene; organic boron compounds such as tri-n-hexylborane and tri-n-octylborane; organic phosphorous compounds such as tribenzyl phosphite, trilaurylphosphite, and trilaurylphosphine; natural oils such as castor oil, fish oil, linseed oil, tall oil, soya oil, tung oil, safflower oil, and oiticica oil; unsaturated fatty acids such as oleic acid, linoleic acid, linolenic acid, elaeostearic acid, ricinoleic acid, and erucic acid; esters of unsaturated fatty acids, such as butyl oleate, monoolein, diolein, triolein, polyethylene glycol mono-oleate, polyethylene glycol dioleate, methyl linoleate, and methyl linolenate; thiols such as 1-dodecanethiol, p-toluenethiol, benzyl mercaptan, 2-mercaptobenzothiazole, and 2-mercaptobenzimidazole; and natural and synthetic resins such as rosin, limed rosin, ester gum, terpene resins, conmarone-idene resins, alkyd resins, unsaturated polyesters, polymers and copolymers of butadiene, and polymers and copolymers of isoprene.

A variety of organic photosensitizers may also be used as polymer-degradation sensitizing reagents. Typical examples of useful photosensitizers include ketones such as acetophenone, acetoin, 1'-acetonaphthone, 2'-acetonaphthone, anisoin, anthrone, bianthrone, benzil, benzoin, benzoin methyl ether, benzoin isopropyl ether, 1-decalone, 2-decalone, benzophenone, p-chlorobenzophenone, di benzalacetone, benzoylacetone, benzylacetone, deoxybenzoin, 2,4-dimethylbenzophenone, 2,5-dimethylbenzophenone, 3,4-dimethylbenzophenone, 4-benzoylbiphenyl, butyrophenone, 9-fluorenone, 4,4-bis-(dimethylamino)-benzophenone, 4-dimethylaminobenzophenone, dibenzyl ketone, 4-methylbenzophenone, propiophenone, benzanthrone, 1-tetralone, 2-tetralone, valerophenone, 4-nitrobenzophenone, di-n-hexyl ketone, isophorone, and xanthone; quinones such as anthraquinone, 1-aminoanthraquinone, 2-amino-anthraquinone, 1-chloroanthraquinone, 2-chloroanthraquinone, 1-methyl-anthraquinone, 2-methylanthraquinone, 1-nitroanthraquinone, 2-phenylanthraquinone, 1,2-naphthoquinone, 1,4-naphthoquinone, 2-methyl-1,4-naphthoquinone, 1,2-benzanthraquinone, 2,3-benzanthraquinone, and phenanthrenequinone; aromatic hydrocarbons such as naphthalene, anthracene, and phenanthrene; nitro compounds such as nitrobenzene, p-nitroanisole, 4-nitrobiphenyl, and p-nitroaniline; organic sulfur compounds such as diphenyl disulfide, dibenzyl disulfide, dibenzoyl disulfide, tetramethylthiuram monosulfide, tetramethylthiuram disulfide, and p-toluenesulfinic acid; halogenated organic compounds, such as chlorinated paraffins, chlorinated biphenyls and polyphenyls, chlorinated toluenes, chlorinated xylenes, benzal chloride, benzhydryl chloride, chlorinated naphthalenes, tetrachlorotetrahydronaphthalene, phenacyl chloride, phenacyl bromide, and styrene dibromide; and aromatic amines such as diphenylamine, triphenylamine, and N-phenyl-beta-naphthylamine.

Organic dyes may also be employed as polymer-degradation sensitizing reagents. Typical examples include Acridine Orange, Acridine Yellow, Alizarin, Azure B, Brilliant Green, Bromthymol Blue, Chlorazol Black E, Congo Red, Crystal Violet, N,N-Dimethyl-p-phenylazo-aniline, Eosin Y, Fluorescein, Indigo, Malachite Green, Martius Yellow, Methylene Blue, Methylene Violet, Methyl Orange, Methyl Red, Orange II, Pararosaniline, Rhodamine B, Rose Bengal, and Solvent Violet 9. Use of organic dyes is particularly attractive in those instances in which it is desired to effect decoration and sensitize degradation at the same time.

It should be understood that combinations of two or more polymer-degradation sensitizing reagents may be employed in the practice of this invention.

Any suitable polymeric material may be treated in accordance with this invention including polymers and copolymers. Typical organic polymers (and copolymers) contemplated especially include polyethylene, polypropylene, poly(1-butene), poly(4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly(vinylidene chloride), polyvinyl fluoride, poly(vinylidene fluoride), polyoxymethylene, poly(ethylene oxide), poly(-propylene oxide), polyvinyl alcohol, polyvinyl acetate, polyvinyl formal, polyvinyl butyral, poly(methyl acrylate), poly(ethyl acrylate), poly(caprolactam), poly-(hexamethyleneadipamide), poly(ethylene terephthalate), vinyl chloride-vinyl acetate copolymers, styrene-butadiene copolymers, styrene-isoprene copolymers, cellulose and cellulosic materials (including paper and paper board), cellulose acetate, cellulose propionate, cellulose acetate butyrate, ethyl cellulose, methyl cellulose, hydroxyethyl cellulose, and hydroxypropyl cellulose. Preferred polymers include polyethylene, polypropylene, poly(4-methyl-1-pentene), polystyrene and polyvinylchloride.

The reagent is applied as a continuous or discontinuous coating directly to the surface of the polymeric material. The coating may be of any suitable pattern, geometric arrangement, etc., and may also convey information, e.g., labeling, advertisements, etc.

As used herein the term 'coating' is intended to be inclusive of other similar terms such as film, deposit, layer, finish, spread, covering, etc.

The actual application of the reagent coating may be by any suitable means such as wet or dry spraying, dipping, printing, brushing, roller coating, electrodeposition, etc.

Preferably the reagent coating is applied in a liquid form or state. Likewise, the reagent coating may contain or be combined with other suitable materials such as solvent, plasticizers, polymeric binders, surfactants, etc.

The diffusion of the reagent into the polymeric surface may be by any suitable means or technique.

In one such technique, the reagent coating and/or the polymeric material are selectively heated to a temperature sufficient to promote diffusion without having an undue or substantial deleterious effect on the polymeric material. Such heat may be applied by any conduction, convection, and/or radiation means such as passage through an oven, flame contact, and electromagnetic radiation such as infra-red, visible, ultraviolet, and microwave radiation.

In another technique, the reagent coating is exposed to an appropriate chemical substance for promotion of the diffusion, such as immersion in a gaseous or liquid compound especially one capable of softening or plasticizing the polymeric material.

Another technique comprises merely allowing the reagent coating and polymeric material to diffuse with time in a suitable environment.

Not all of the reagent coating ingredients may diffuse into the polymeric material. Any residue on the polymeric surface may be removed by any appropriate method such as wiping, washing, etc.

The polymeric material may be of any suitable geometric shape or configuration and may comprise containers, films, and other plastic bodies.

In comparison to alternative methods of preparing mixtures of organic polymers and degradation-sensitizing reagents, the practice of this invention offers the following advantages. As previously noted, degradation during the melting and shaping of thermoplastic materials is avoided. The coating composition containing the degradation-sensitizing reagent(s) can be applied selectively to certain points or areas of a plastic article, in order to control the manner in which the article will collapse as a resulting of partial degradation and/or mechanical crushing. If desired, the application of the degradation-sensitizing reagent can be combined with a decoration process. If the plastic article is a container, application of the degradation-sensitizing reagent to the outer surface will ensure that diffusion will proceed from the outer surface inward, thus minimizing the possibility that the degradation-sensitizing reagent can come into contact with the product subsequently packaged in the container.

The following examples represent some of the best embodiments contemplated by the inventors in the practice of this invention.

EXAMPLE 1

A small quantity (ca. 0.5–1. Og.) of each of the solids listed below was placed in a 50-ml. polypropylene beaker. The beakers were then placed in an oven and heated 16 hours in air at 120°C. In each case, the polypropylene was 'stained' by the additive, and mechanical embrittlement indicated that the polypropylene had undergone extensive degradation.

Cobalt 2-ethylhexanoate
Cobaltic acetylacetonate
Cobaltous acetylacetonate
Chromic acetylacetonate
Ferrous stearate
Ferric acetylacetonate
Manganic acetylacetonate
Manganous acetylacetonate
Nickel acetylacetonate

EXAMPLE 2

A sample (ca. 0.5–1.0 ml.) of each of the liquid 'driers' listed below was placed in a 50 ml. polypropylene beaker. The beakers were heated 24 hours in air at 110°C., then examined for 'staining' (indicative of diffusion of the additive into the polypropylene) and cracking (indicative of mechanical damage due to chemical degradation). In each case, both staining and cracking were observed.

Cobalt tallate 6 percent
Cobalt linoleate 6 percent
Cobalt neodecanoate 12 percent
Copper neodecanote 6 percent
Iron neodecanoate 6 percent
Iron tallate 6 percent
Manganese naphthenate 6 percent
Nickel neodecanoate 10 percent

EXAMPLE 3

A sample of each of the liquids listed below was placed in the bottom of a 50 ml. polypropylene beaker, which was 'stained' by heating one-half hour at 110°C. Excess liquid was removed from the beakers, which were then exposed for 136 hours to the light of a 275 watt sunlamp. In each case, gentle flexing of the treated beaker led to the development of cracks, whereas a similarly treated additive-free polypropylene beaker failed to crack.

Cobalt linoleate
Cobalt neodecanoate
Copper neodecanoate
Iron linoleate
Iron neodecanoate

EXAMPLE 4

A sample (ca. 0.5 g.) of each of the dyes indicated below was placed in the bottom of a 50 ml. polypropylene beaker. Diffusion of the dye into the polymer was promoted by heating 24 hours at 120°C. in a nitrogen atmosphere. After removal of excess additive, the 'stained' beakers were subjected to intense (ca. 20,000 microwatts/cm.$^2$) ultraviolet radiation, in air, for 48 hours. In the case of the following dyes, this irradiation caused severe damage to the stained portion of the beaker.

Acetosol Red BLS
Acridine Orange
Acridine Yellow
Chlorazol Black E
Eosin Y
Phenazo Brilliant Scarlet R.O.
Rhodamine B Base

We claim:

1. A process for preparing a degradable polymeric composition by the chemical modification of a polymeric material, which process comprises applying a degradation-sensitizing reagent to the surface of a polymeric material and then diffusing the reagent into such surface.

2. The process of claim 1 wherein the polymeric material is selected from polyethylene, polypropylene, poly(4-methyl-1-pentene), polystyrene, and polyvinylchloride.

3. The process of claim 1 wherein the degradation-sensitizing reagent is selected from free-radical initiating reagents, metallo-organic autoxidation catalysts, readily autoxidized organic compounds, and photosensitizers.

4. The process of claim 1 wherein the degradation-sensitizing reagent is selected from organic peroxides, organic hydroperoxides, organic azo compounds, metallo-organic compounds, organic materials which undergo facile autoxidation, organic photosensitizers, and organic dyes.

5. The process of claim 1 wherein the diffusing of the reagent is accomplished by the application of heat.

6. The process of claim 1 wherein the reagent is applied as a continuous layer to the surface.

7. The process of claim 1 wherein the polymeric material is in the geometric shape of a container.

8. As an article of manufacture, a degradable polymeric substrate having a degradation-sensitizing reagent diffused into its surface.

9. The invention of claim 8 wherein the substrate is a container.

10. The invention of claim 9 wherein the polymeric material is selected from polyethylene, polypropylene, poly(4-methyl-1-pentene), polystyrene, and polyvinylchloride.

* * * * *